July 30, 1957 E. R. ZADEMACH 2,800,995
ROTARY TABLE CONVEYORS FOR CLEANSING APPARATUS
Original Filed Oct. 15, 1940 5 Sheets-Sheet 1

INVENTOR.
Erich R. Zademach

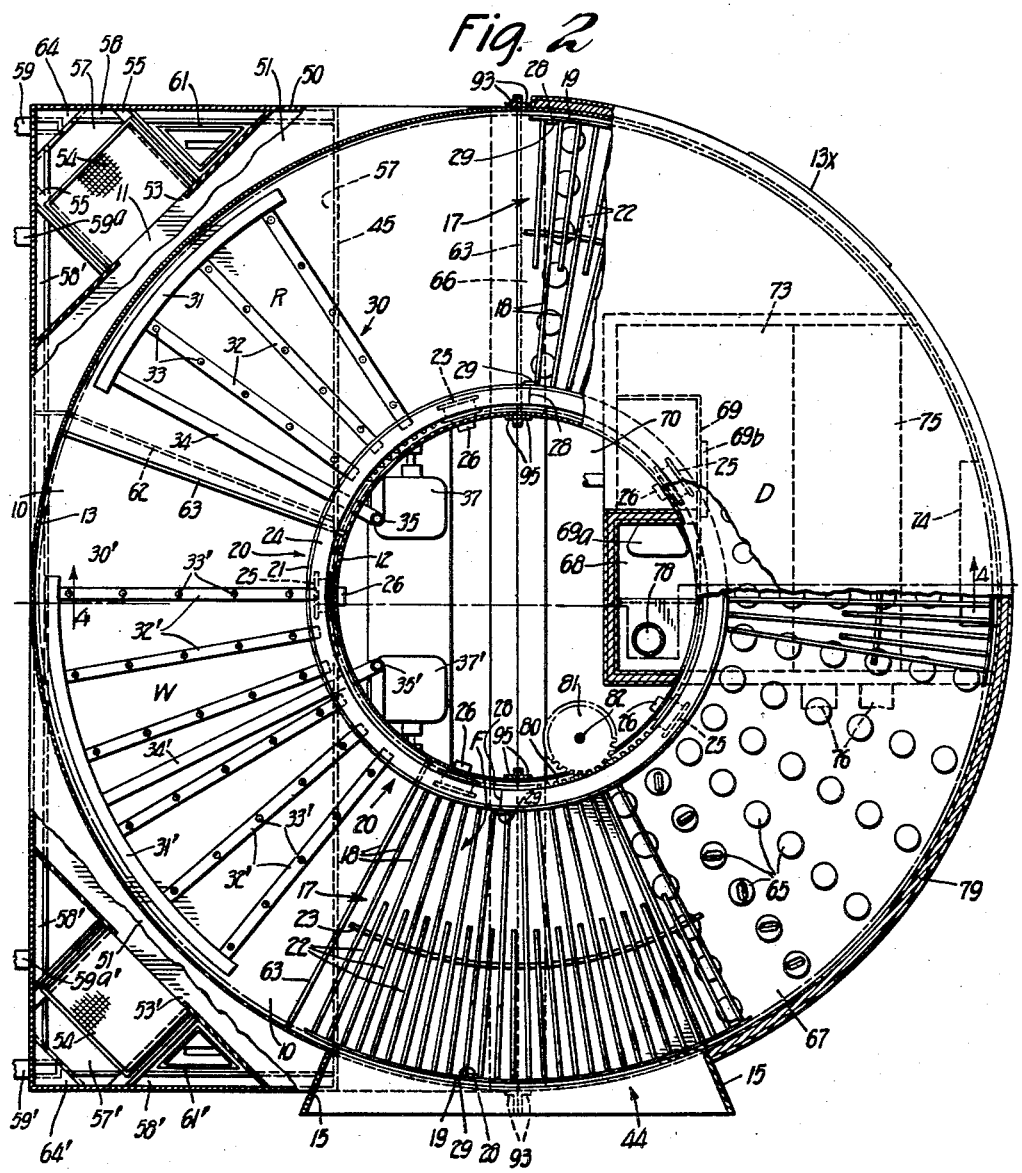

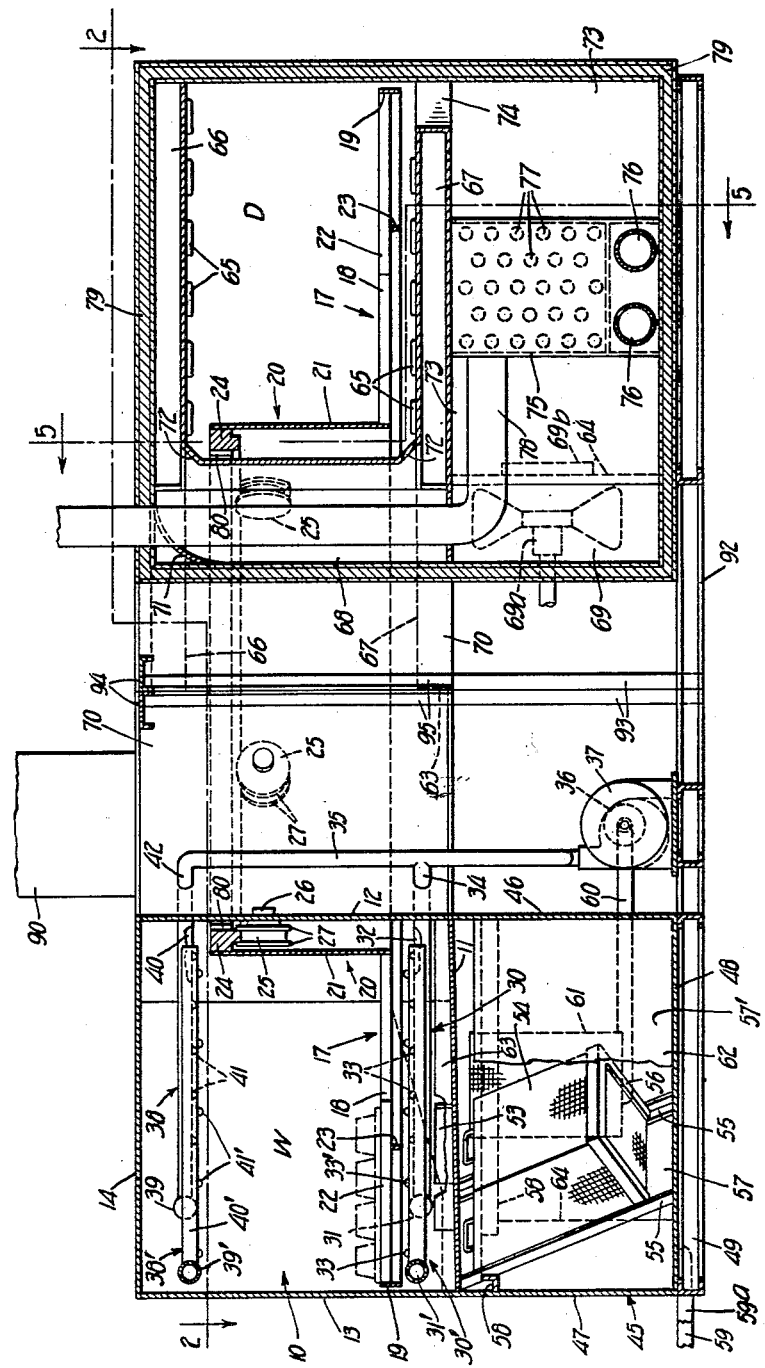

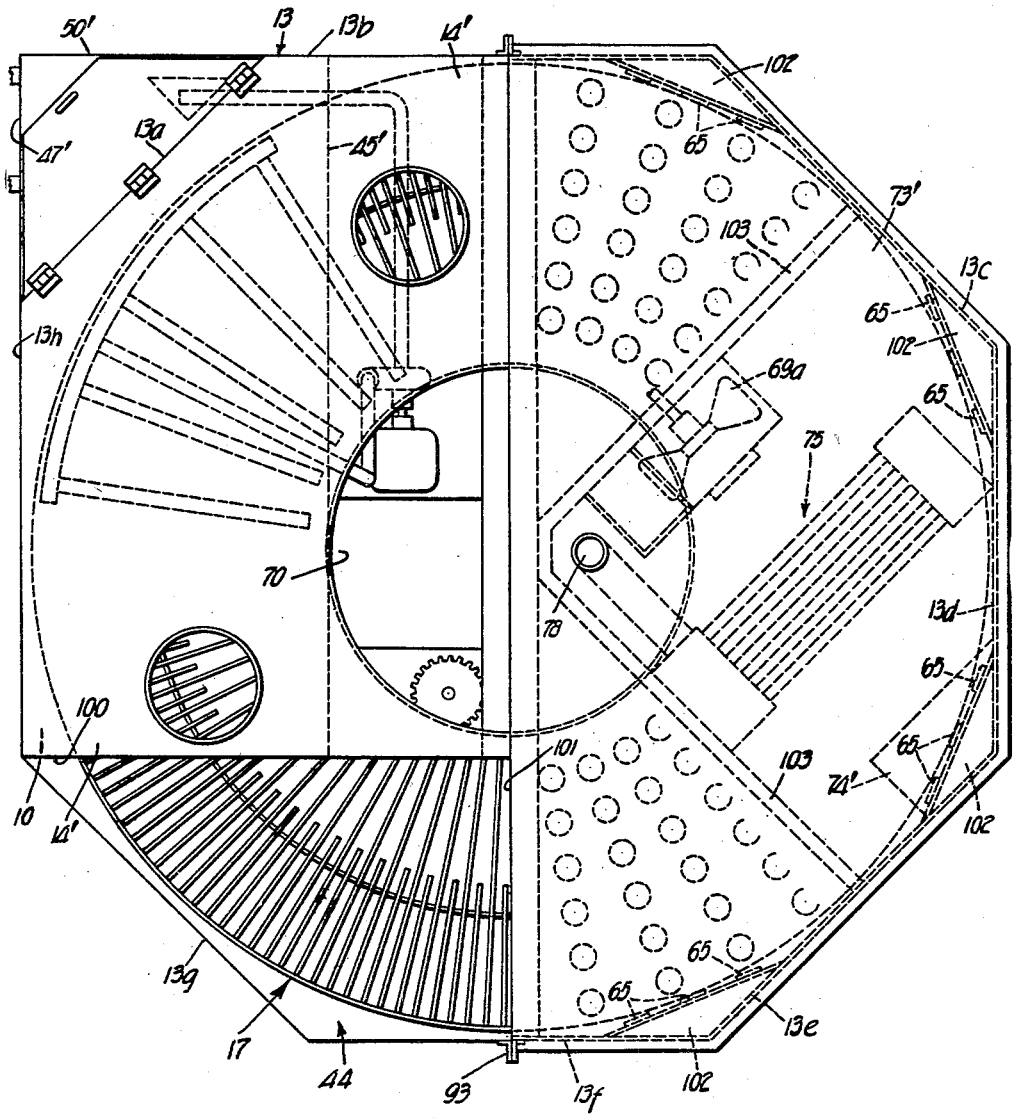

July 30, 1957     E. R. ZADEMACH     2,800,995
ROTARY TABLE CONVEYORS FOR CLEANSING APPARATUS
Original Filed Oct. 15, 1940     5 Sheets-Sheet 5
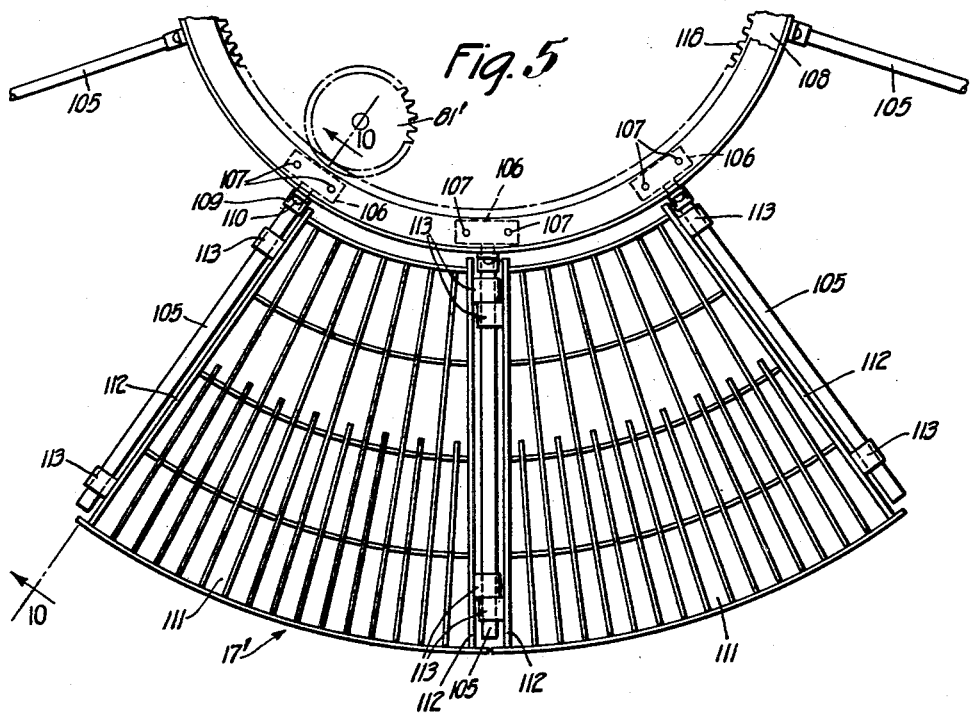
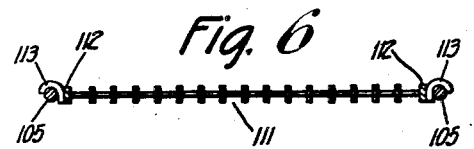
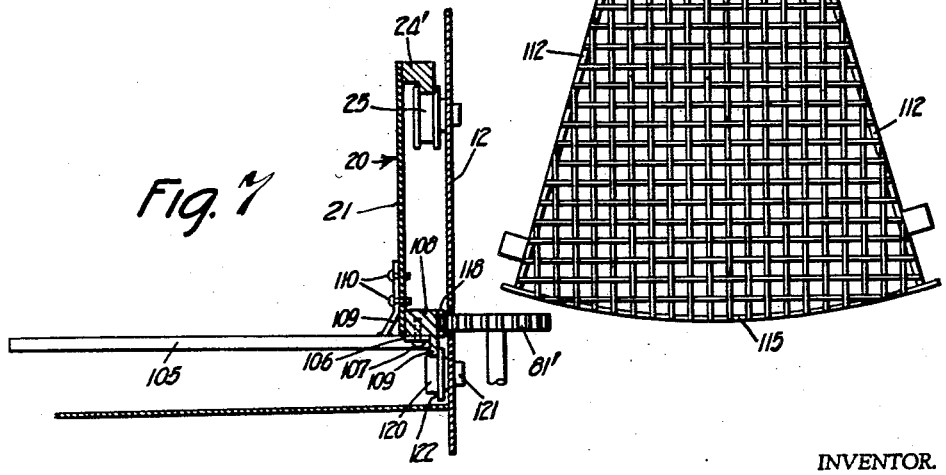
INVENTOR.
Erich R. Zademach
BY
ATTORNEYS

United States Patent Office 2,800,995
Patented July 30, 1957

2,800,995

ROTARY TABLE CONVEYORS FOR CLEANSING APPARATUS

Erich R. Zademach, Hillside, N. J., assignor to Metalwash Machinery Company, Newark, N. J., a copartnership Application June 4, 1948, Serial No. 31,108, now Patent No. 2,688,407, dated September 7, 1954, which is a division of application Serial No. 361,211, October 15, 1940. Divided and this application December 17, 1953, Serial No. 406,125

6 Claims. (Cl. 198—209)

This invention relates to apparatus for the continuous fluid treatment of articles traveling on an enclosed conveyor, and is particularly directed to apparatus for continuously subjecting articles to washing and drying operations or other successive steps employing any desired combination of liquid or gas treatments. It has been particularly developed for use in washing and drying pans and other containers generally employed in commercial bakeries. In this field the pans are first subjected to washing with jets of hot water carrying suitable detergents, followed by drying with jets of heated air.

The present application constitutes a division of application Serial No. 31,108, filed June 4, 1948, now Patent No. 2,688,407, issued September 7, 1954, which application was a division of application Serial No. 361,211, filed October 15, 1940, now Patent No. 2,443,091.

An important feature of the invention is the provision of a rotary arrangement of this type. This construction permits the elimination of one of the operators required on previous straight types of apparatus, since the same operator can be employed for both the insertion and the removal of the articles to be processed. It also has been utilized to provide a very compact and efficient arrangement both of the processing chambers and of the auxiliary fluid-handling apparatus.

This type of arrangement utilizes a rotary support for the articles traveling in an annular enclosed chamber, the treating liquids or gases being introduced at successive points in the chamber. As some or all the treating fluids are preferably hot, it is important that the chamber be enclosed as effectively as possible. This presents serious mechanical problems in the support and drive of the rotary conveyor. The use of a central shaft provided with radial supports for the conveyor is open to serious objections, partly because of the difficulty of sealing the treating chamber, and partly because it renders the central portion of the apparatus inaccessible without stopping the conveyor. A feature of the invention is the provision of an annular conveyor-supporting structure which may be fully sealed while leaving the central part of the apparatus open and accessible during operation.

This invention relates to improvements in construction and arrangement of the conveyor, including an improved conveyor support and drive, a shield arrangement which protects working parts while exposing the articles to full cleansing action, and improved sectional construction which facilitates shipping the articles in parts as already indicated, as well as convenience of assembly, repair and replacement of parts.

Other objects and advantages will appear from the detailed description of the preferred embodiment illustrated in the accompanying drawings in which:

Fig. 2 is a horizontal sectional view on line 2—2 of Fig. 3 with parts broken away;

Fig. 3 is a transverse axial section on line 4—4 of Fig. 2;

Fig. 4 is a top plan view similar to Fig. 1 showing a modified arrangement having a generally octagonal contour;

Fig. 5 is a fragmentary top plan view of a portion of a modified sectional type of conveyor;

Fig. 6 is a vertical transverse sectional view through one of the conveyor sections shown in Fig. 5;

Fig. 7 is a fragmentary vertical section on line 10—10 of Fig. 5; and

Fig. 8 is a plan view of a modified form of an article supporting section.

Figure 1:
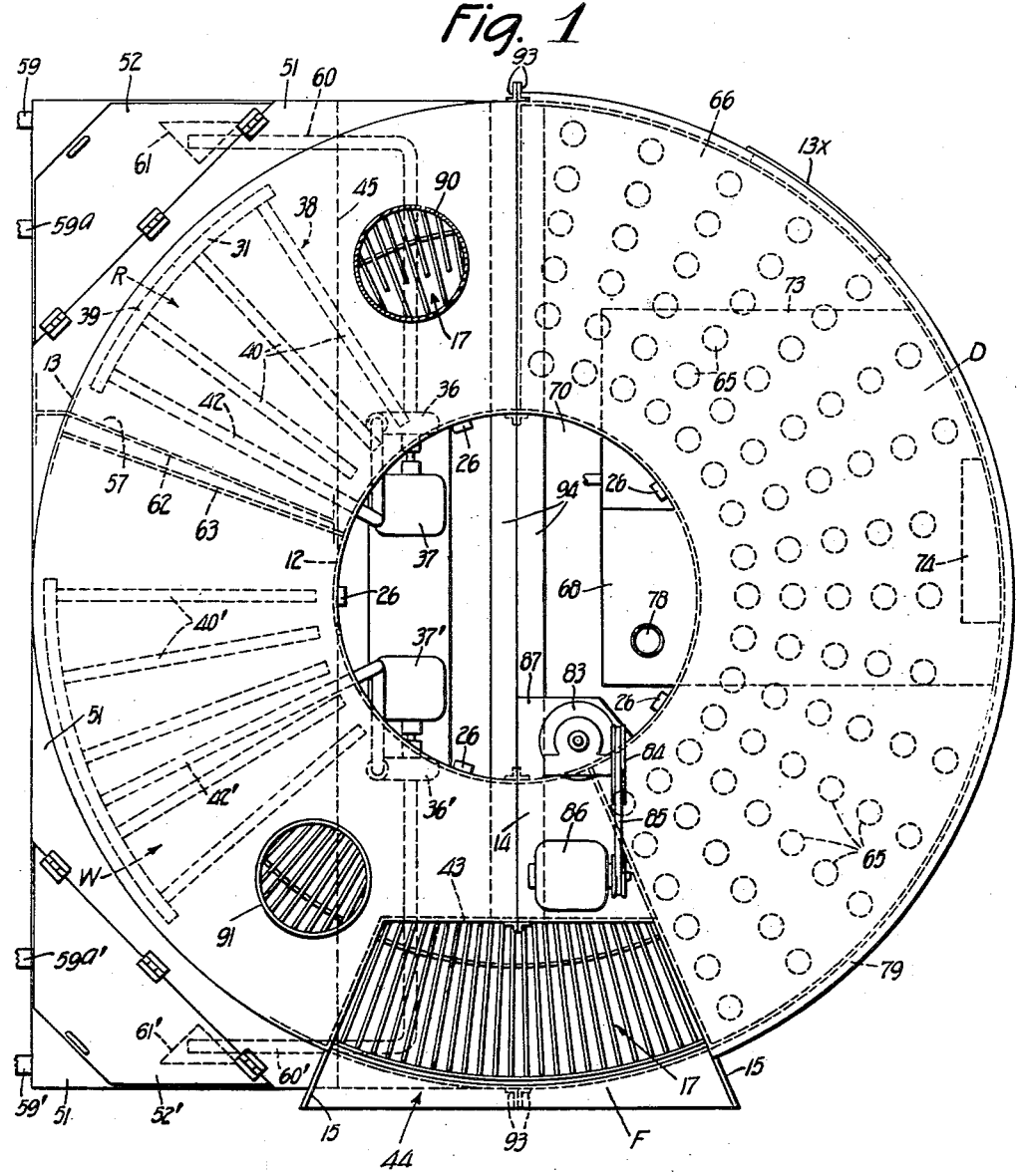
Fig. 1 is a top plan view of the apparatus.

The invention is illustrated by an apparatus particularly adapted for use in cleaning various types of pans used in commercial baking. It comprises in general an annular treating chamber 10 which in the form shown in Figs. 1 to 3 is divided into a washing zone W, a rinsing zone R, a drying zone D and a feed discharge zone F. The treating chamber 10 is formed by suitable sheet metal walls including bottom 11, cylindrical inner wall 12, outer wall 13 and top 14 (Fig. 2) connected to form a complete enclosure except at the feed and discharge opening 44 through the outer wall 13.

A suitable annular conveyor 17 is supported and rotated in chamber 10. In the form shown in Figs. 1–4 the conveyor includes an article supporting grate 17 formed from radial bars 18 fixed at their ends to outer rim 19 and cylindrical grate support 20, which in this form consists of a sheet metal cylinder 21. In the outer portion of grate 17 intermediate bars 22 are provided, attached at their outer ends to rim 19 and supported adjacent their inner ends by the intermediate supporting ring 23.

The grate support cylinder 21 extends upwardly substantially to the top of the available space for the articles to be washed and carries along its inner face, preferably adjacent the upper end, an annular rail 24 resting on a series of rollers 25 rotating in bearings 26 mounted on the inner wall 12 of the treating chamber. Rail 24 advantageously extends between flanges 27 on rollers 25 to maintain the grate 17 in radial alignment.

In this arrangement cylinder 21 is formed from a continuous sheet of suitable metal and serves also as a shield, protecting the supporting and driving elements located on the inner side thereof from the treating liquid applied to the articles on the conveyor grate 17.

A suitable arrangement is provided for revolving the grate 17 at the desired speed. For this purpose, Figs. 1–3, the rail 24 is provided with an inwardly extending annular rack 80 engaged by pinion 81 (Fig. 2) extending through a restricted opening in the inner wall 12 and driven through vertical shaft 82, reducing gear 83 (Fig. 1), pulley 84 and belt 85 from motor 86 mounted on the top plate 14.

The construction illustrated in Fig. 4 is generally similar to the form shown in Figs. 1–3, except for certain specific features. In this construction the outside to the tank is octagonal in shape, avoiding the expense incident to the provision of curved parts. In this embodiment only one liquid treatment section is shown, arranged and constructed in the same general manner as the rinsing section described in my U. S. Patent No. 2,443,091.

In Figs. 5–8 the conveyor 17' is provided with removable grate sections mounted on a suitable frame. The frame consists of a plurality of equally spaced radial rods 105, each carrying at its inner end a mounting plate 106 attached as by means of screws 107 to lower frame ring 108, and supporting strips 109 connected at one end to rod 105 as by welding and detachably connected to the cylindrical grate support 20 as by screws 110.

Suitable grate sections are removably mounted on rods 105, the section 111 illustrated in Figs. 5 and 6 being of the same general construction as the grate shown in Figs.

1–4, being provided with side bars 112 carrying hook-shaped hangers 113 of sheet metal fitting over rods 105 and advantageously extending around the rods to a sufficient distance to prevent substantial radial movement of sections 111. A modified form of grate section 111a is shown in Fig. 8, in which the section is covered with woven wire welded to the side bars 112 as well as to the inner frame bar 114 and outer frame bar 115 connecting side bars 112. Bars 114 and 115 are concentric with the axis of rotation to the conveyor.

In Figs. 5 and 8 an arrangement for supporting and driving the conveyor is illustrated. For this purpose frame ring 108 is provided with an inner rack or ring gear 118 engaged by pinion 81′ corresponding to pinion 81. This arrangement also may include means for supporting the conveyor from beneath, the illustrated embodiment comprising a rail 119 extending downwardly from frame ring 108 and resting upon rollers 120 rotating on studs 121 mounted on the inner wall 12. Flanges 122 on rollers 120 engage the inner face of rail 109 and hold said rail, ring 108 and the structures carried thereby in proper radial as well as vertical position. This constitutes, therefore, a support in addition to the support furnished by the rollers 25 and rail 24.

I have described what I believe to be the best embodiments of my invention. I do not wish, however, to be confined to the embodiments shown, but what I desire to cover by Letters Patent is set forth in the appended claims.

What is claimed is:

1. A treating apparatus comprising an annular treating chamber having stationary inner and outer peripheral walls, a rotary table conveyor supported in said chamber, a vertical suspending wall connected to said conveyor rotating in said chamber with said conveyor, conveyor drive means extending through the inner wall of the chamber, said vertical suspending wall being coextensive with the inner peripheral margin of said rotary conveyor, upper support means affixed to the inner wall of the chamber engaging the upper portion of the vertical suspending wall and lower support means affixed to the inner wall of the chamber engaging the lower portion of the conveyor.

2. A treating apparatus as in claim 1, wherein, said inner peripheral wall defines a center space, an inner first frame ring on said rotary table conveyor, a series of teeth secured to and extending along said first frame ring, and said conveyor drive means including a drive gear extending from said center space through an opening in said inner peripheral wall and meshing with said teeth to drive said conveyor.

3. A treating apparatus as in claim 2 in which said first frame ring is located substantially in the plane of said conveyor.

4. A treating apparatus as in claim 3, wherein said upper support means consists of a second peripheral frame ring connected to the vertical suspending wall at its upper extremity, and a series of rollers on said inner peripheral wall engaging said second frame ring for supporting the conveyor.

5. A treating apparatus as in claim 4, wherein said lower support means consists of a series of rollers engaging said inner first frame ring at its lower portion to support the conveyor.

6. A treating apparatus as in claim 5 in which each of said rollers engaging a frame ring has a flange to hold said conveyor against radial movement.

References Cited in the file of this patent

UNITED STATES PATENTS

| | | |
|---|---|---|
| 625,784 | Mohun | May 30, 1899 |
| 1,156,424 | Murray | Oct. 12, 1915 |
| 1,602,291 | Thibault | Oct. 5, 1926 |
| 1,699,538 | Keller et al. | Jan. 22, 1929 |
| 1,707,159 | Burnham | Mar. 26, 1929 |
| 1,761,812 | Breton | June 3, 1930 |
| 1,939,308 | McEwan | Dec. 12, 1933 |
| 2,290,530 | Blackman | July 21, 1942 |
| 2,369,529 | Burkholdt | Feb. 13, 1945 |
| 2,415,201 | Zademach et al. | Feb. 4, 1947 |

FOREIGN PATENTS

| | | |
|---|---|---|
| 489,828 | France | Oct. 31, 1918 |